A. CASTERIS.
FLORAL DECORATION.
APPLICATION FILED JAN. 6, 1916.

1,225,767.

Patented May 15, 1917.

Inventor,
Antonio Casteris,
By his Attorney,
W. B. Hutchinson.

UNITED STATES PATENT OFFICE.

ANTONIOS CASTERIS, OF NEWARK, NEW JERSEY.

FLORAL DECORATION.

1,225,767.   Specification of Letters Patent.   Patented May 15, 1917.

Application filed January 6, 1916. Serial No. 70,599.

*To all whom it may concern:*

Be it known that I, ANTONIOS CASTERIS, a citizen of the United States, and a resident of the city of Newark, county of Essex, and State of New Jersey, have invented a new and useful Improvement in Floral Decorations, of which the following is a full, clear, and exact description.

My invention relates to improvements in floral decorations, and the principal object of my invention is to produce a more beautiful structure than can be made in the ordinary way. Another object of my invention is to produce a floral decoration which is constructed in such a manner that the freshness of the flowers or the like will be preserved for a long time. Another object of my invention is to produce a structure of the kind described which can be easily made and will not be expensive. In carrying out my idea I employ tree branches or the like which serve as a foundation for the decoration, and select wood preferably with the bark thereon, and of an open cellular or porous pithy structure, so that liquid can freely circulate therethrough. I arrange these tree branches to form a special design which may be desired, connect specially constructed bottles carrying liquid plant food which will supply the same to the branches, then pierce the branches at necessary points and stick the stems of the flowers or the like into the holes. In this way I get a very beautiful decoration, and one which will keep fresh for a long time. Moreover if any part of the foundation shows it will show simply the bark, which does not detract from the appearance of the structure.

Reference is to be had to the accompanying drawings forming a part of this specification, in which similar reference characters indicate corresponding parts in all the views.

Figure 1:
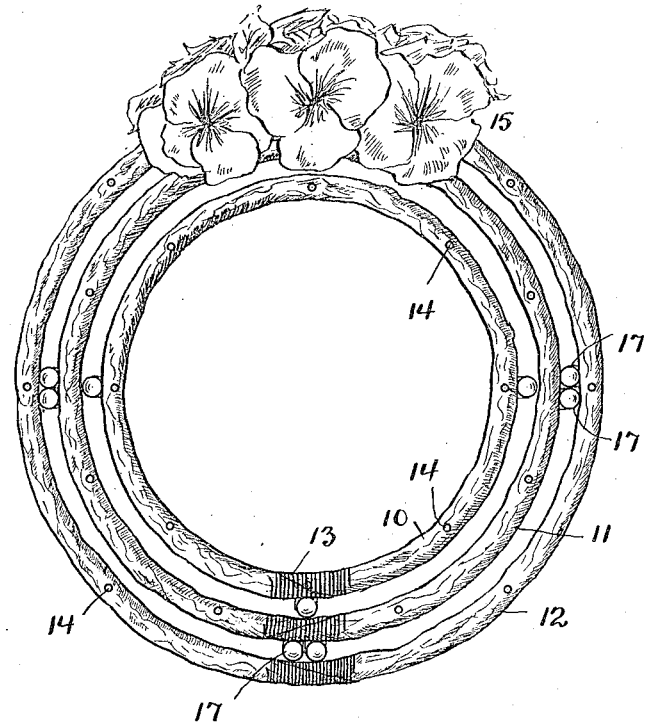
Figure 1 is a broken plan view of a wreath partly made and showing my improvements.
Figure 2:
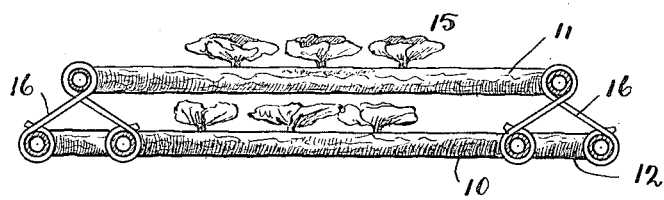
Fig. 2 is a cross section of the same.
Figure 3:
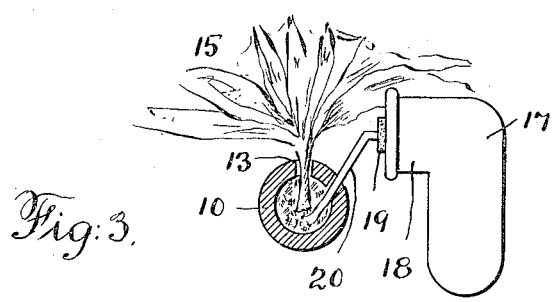
Fig. 3 is an enlarged cross section through one branch of the decoration, and shows also the bottle connection therewith.

It will be understood that I can make a decoration of any approved form, and in the figures I have shown one application of the invention in which a conventional wreath is the design. In constructing a wreath I take a plurality of branches 10, 11 and 12, and the ends of each branch are fastened together as shown at 13, this fastening being done in any usual or preferred way. As illustrated the ends are overlapped at an angle, and bound with wire. Any suitable soft wood can be used, and wood of a pithy nature is preferable so that the liquid for the flowers and the like will circulate freely therethrough.

For a wreath I preferably arrange the branches 10 and 12 on the same plane or essentially so, and the branch 11 is raised so as to lie on another plane, and above a point between the members 10 and 12. The several branches are pierced at necessary intervals as shown at 14, and the stems of the flowers 15, or the like, are inserted in the holes thus made. The several members 10, 11 and 12 are spaced apart and held in proper relation by means of wires 16, or blocks of wood or any suitable spacing means can be used.

In connection with the foregoing I use a special form of bottle which adapts itself to the purpose. This bottle 17 has its upper extremity bent sharply at an angle as shown at 18 so that the body portion can be thrust down between the members of the wreath or other structure, and the top will engage some member of the structure and keep the bottle in place. In practice I cover the bottle with bark or something simulating bark, so that it will be inconspicuous.

The bottle is provided with a cork 19, and through this leads a small tube 20 which also enters a hole in one of the branches 10, 11 or 12. These bottles are arranged preferably in groups. For instance in making a wreath I would group them at intervals as shown in Fig. 1, and the liquid which they carry will be fed to the branches and will keep the flowers 15, or like decoration, fresh for a long time.

It is obvious that a greater or less number of the branches 10, 11 and 12 can be used as desired, and that these can be laid up and shaped to form any preferred design, but the principle of the invention is the same in either case, and by use of the invention I attain the first requisite of a decoration, that is, beauty, and next, relative permanency. Moreover I find that I can build up designs in this way with as great facility as by ordinary methods.

It will be noticed that a floral decoration constructed in accordance with my invention has the advantage of the most natural appearance, as opposed to the artificial and mechanical effect of most decorations of this sort.

I claim:—

1. A floral decoration comprising endless branches of a structure to permit the circulation of liquid therethrough and provided with holes, means for supplying liquid to the branches, means for supporting the branches in fixed spaced relation, and floral elements having their stems inserted in the holes of the branches.

2. A floral decoration comprising a plurality of branches of a structure to permit the circulation of a liquid therethrough and provided with holes, means for holding the branches in spaced relation, a bottle adapted to fit between the branches, said bottle having an angular off-set thereon, a tube extending from the bottle into a branch, and floral elements with their stems inserted in the holes in the aforesaid branches.

ANTONIOS CASTERIS.

Witnesses:
 WARREN B. HUTCHINSON,
 M. G. O'DONNELL.